UNITED STATES PATENT OFFICE.

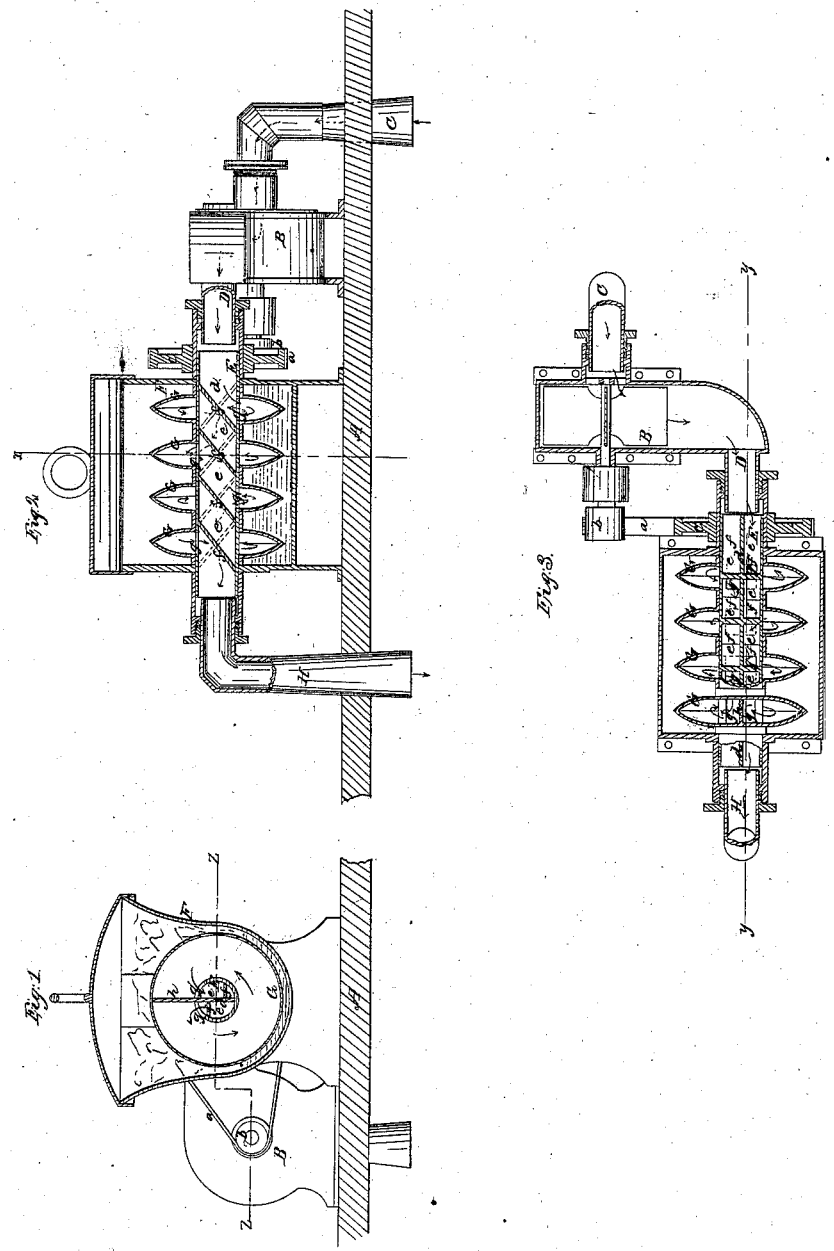

ALOIS PETELER, OF NEW BRIGHTON, NEW YORK.

APPARATUS FOR DISINFECTING FOUL AIR IN VESSELS.

Specification of Letters Patent No. 31,996, dated April 9, 1861.

*To all whom it may concern:*

Be it known that I, ALOIS PETELER, of New Brighton, in the county of Richmond and State of New York, have invented a new and Improved Apparatus for Disinfecting the Foul Air of Vessels, &c.; and I do hereby declare that the following is a full, clear, and exact description of the same, reference being had to the accompanying drawings, forming a part of this specification, in which—

Figure 1, represents a transverse vertical section of this invention. the line $x$, $x$, Fig. 2 indicating the plane of section. Fig. 2, is a longitudinal vertical section of the same, taken in the plane indicated by the line $y$, $y$, Fig. 3. Fig. 3 is a horizontal section of the same, the plane of section being indicated by the line $z$, $z$, Fig. 2.

Similar letters of reference in the three views indicate corresponding parts.

This invention consists in combining a fan blower or other device for creating a current of air with a refrigerating chamber, and with suitable suction and discharge pipes, in such a manner that by the aid of said fan blower or its equivalent the infected air of a vessel or other closed space can be passed once or several times through the refrigerating chamber, until its temperature is brought down to such a degree, that the miasms or other impurities which cause the infection, are destroyed, without allowing any portion of the infected air to escape to the open atmosphere.

It consists also in the peculiar arrangement of a series of hollow revolving drums on a hollow shaft, the interior of which is divided into several channels, as will be hereinafter more fully explained, in combination with the fan blower and refrigerating chamber in such a manner that the current of air created by the fan blower is compelled to make a long circuit in the interior of the refrigerating chamber, and that its temperature is reduced considerably, before it is permitted to pass out on the opposite side of said refrigerating chamber.

To enable those skilled in the art to make and use my invention I will proceed to describe its construction and operation with reference to the drawing.

A. represents the deck of a vessel or the top of a room or other space supposed to be filled with infected air. Secured to this deck is the fan blower B. to which the air is supplied through the pipe C. which extends down into the space below the deck, its lower end being enlarged or bell shaped, so that the air passes readily up to it. Instead of the fan blower however any other device capable of sucking up the air from one side, and forcing it out toward the other, might be employed. From the fan blower and by its action the air passes through the pipe D. into the hollow shaft E. which has its bearings in the ends of a chamber or box F. and to which a rotary motion is imparted by means of a belt $a$, passing over pulleys $b$, $c$. The interior of this shaft is divided into two halves by a partition $d$, passing through its longitudinal center, and each of these halves is again divided into several compartments or channels $e$, by means of a series of inclined partitions $f$, that are secured in the interior of the hollow shaft in a position as clearly shown in Figs. 2 and 3, of the drawing. Through these channels the air passes into the hollow drums G. which are rigidly attached to the hollow shaft E, and which communicate with the interior of said shaft each by means of two apertures $g$, $g'$, situated on opposite sides of the central partition $d$, so that one of the apertures leads to one and the other to the other half of the interior of the shaft. The interior of each drum is furnished with an abutment $h$, situated between the two apertures $g$, $g'$, and exactly in line with the central partition $d$, as clearly shown in Fig. 1 of the drawing. Furthermore these drums are so arranged that the apertures $g$, $g'$, which lead from the 1st, 3rd, 5th, etc., drum to the interior of the shaft are on one side, and those apertures which form the communication between the interior of the shaft and the 2nd, 4th, 6th, etc., drum are on the opposite side of the shaft E. as clearly shown in Fig. 2. By these means the air as it passes from the fan blower into the hollow shaft on one side of the central partition $d$, enters the first drum through the aperture $g$, and it has now to make a complete circuit through this drum before it reaches the aperture $g'$, on the opposite side of the partition $d$, as clearly shown in Fig. 1, by the arrows indicating the current of the air. Through this aperture the air passes out and through one of the channels $e$, formed by the inclined partitions $f$, in the interior of the shaft to the aperture leading from the shaft to the 2nd drum where it is again compelled by the abutment in said drum to make a complete circuit in order to reach the aperture $g$, (Fig. 2) leading from this drum to the channel $e$, through which it passes to the 3rd drum, and so forth, until it reaches the last drum, from which it is conducted through the tube H. back into the space below the deck A.

The chamber F. in which the drums G. with the shaft E. rotate is filled with ice or with some freezing composition, and the air in making its circuit through the several drums and through the shaft, is kept for a considerable time in contact with the cold sides of said drums and shaft, all of which ought to be made of sheet copper or some other good conductor of heat. By these means the temperature of the air is considerably reduced and on passing back into the space below the deck the cold air, being the heaviest, sinks down to the bottom, and a fresh supply of the heated and infected air is passed through the apparatus, until, after a short time, the temperature of the air in the space below the deck is reduced to such a degree, that the miasms or other impurities, which cause the infection, are decomposed or rendered innoxious.

It will be seen that by these means the air of an infected vessel can be completely disinfected, without allowing any portion of the infected air to escape to the open atmosphere, which is of peculiar advantage for vessels infected by yellow fever or other contagious diseases, which are liable to spread from the vessels to the neighboring shores, if the infected air is allowed to escape from the vessel to the open atmosphere.

It is obvious that with my apparatus the disinfection can be effected with equal facility before and after the cargo has been removed, and if an infected vessel arrives in port it is only necessary to close down the hatchways and to apply my apparatus and in the course of half a day or a day the temperature of the air in the entire vessel can be reduced to such a low point, that the previously infected air is rendered perfectly harmless, and the cargo can now be removed without any danger to the men employed in doing this work, or to the people in the neighborhood.

My apparatus may also be used with advantage to reduce the temperature of the air in rooms and buildings or to disinfect the air in the same.

What I claim as new and desire to secure by Letters Patent; is,

1. The arrangement of a fan blower B. or its equivalent in combination with the refrigerating chamber F. and tubes C. and H, passing through the deck A. of a vessel or other closed space substantially in the manner and for the purpose set forth.

2. The arrangement of the rotary hollow shaft E. with channels $e$, apertures $g, g'$, and drums G. with abutments $h$, in combination with the fan blower B. or its equivalent, tubes C. and H., and with the refrigerating chamber F. constructed and operating in the manner and for the purpose described.

ALOIS PETELER.

Witnesses:
C. W. COWTAN,
M. M. LIVINGSTON.